Feb. 20, 1934.  J. H. REILLY  1,947,491
PREPARING TETRACHLOROETHYLENE
Filed Feb. 1, 1933  2 Sheets-Sheet 1

INVENTOR
John H. Reilly
BY
Thomas Griswold, Jr.
ATTORNEY

Feb. 20, 1934.    J. H. REILLY    1,947,491
PREPARING TETRACHLOROETHYLENE
Filed Feb. 1, 1933    2 Sheets-Sheet 2

INVENTOR
John H. Reilly
BY
Thomas Griswold, Jr.
ATTORNEY

Patented Feb. 20, 1934

1,947,491

UNITED STATES PATENT OFFICE 1,947,491

PREPARING TETRACHLOROETHYLENE

John H. Reilly, Midland, Mich., assignor to The Dow Chemical Company, Midland, Mich., a corporation of Michigan Application February 1, 1933. Serial No. 654,602

8 Claims. (Cl. 260—166)

The invention relates to processes for the preparation of tetrachloroethylene.

The preparation of tetrachloroethylene is ordinarily accomplished by chlorinating ethylene to pentachloroethane and reducing the pentachloro-compound with an alkali metal or alkaline earth metal hydroxide. In contrast to the foregoing, I have now found that tetrachloroethylene can be prepared directly in good yields by the treatment of an olefine chloride with chlorine at temperatures between about 300° and about 500° C. in the presence of a suitable catalytic agent.

The invention, then, consists of the steps hereinafter fully described and particularly pointed out in the claims, the annexed drawings and the following description setting forth in detail several modes of carrying out the invention, such disclosed modes illustrating, however, but several of various ways in which the principle of the invention may be used.

In said annexed drawings:—

Figure 1:
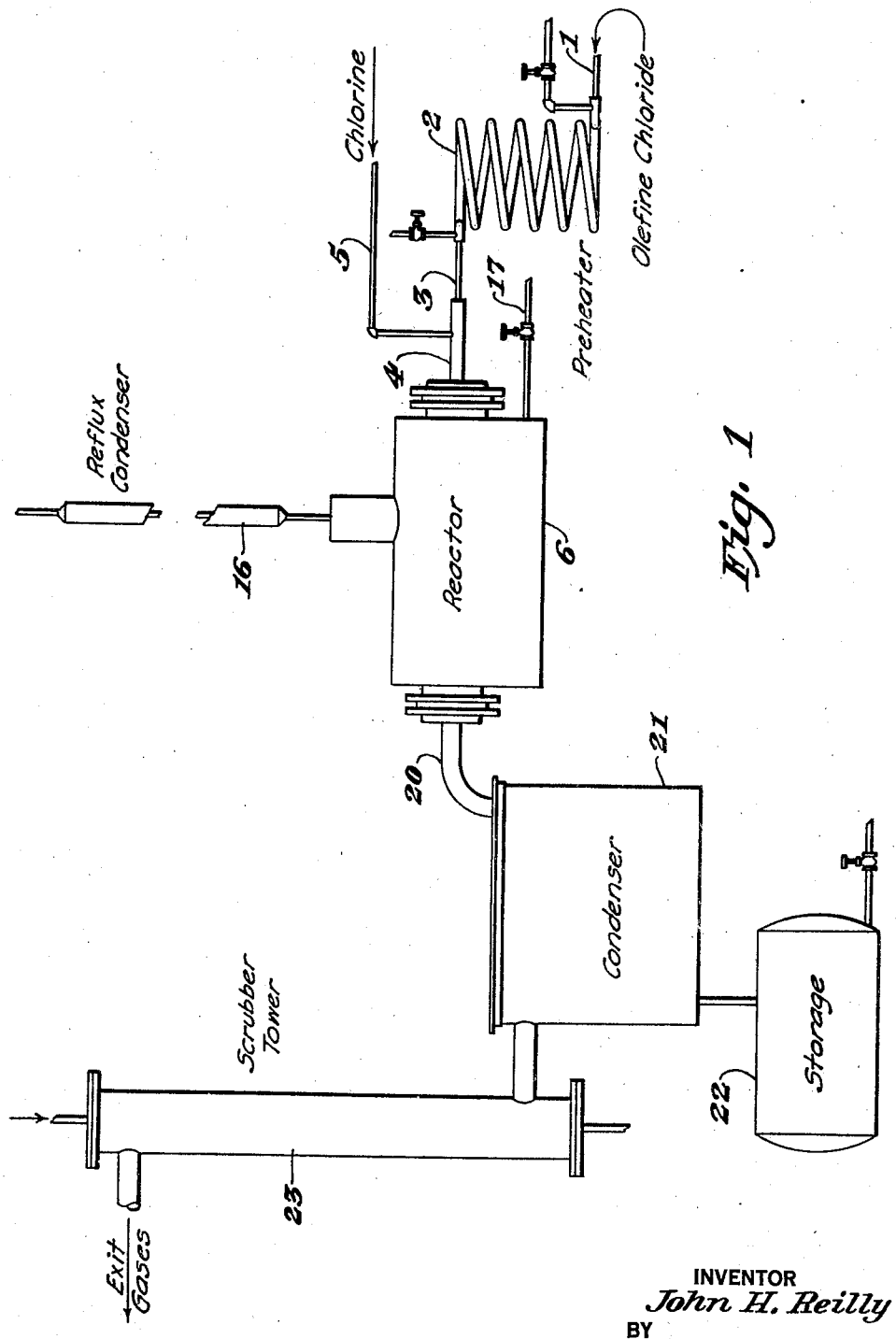
Figure 1 shows diagrammatically in side elevation suitable apparatus for carrying out my invention.

My improved process for the preparation of tetrachloroethylene comprises passing a mixture of an olefine chloride and chlorine, in the gaseous phase, through a reactor packed with a porous surface catalyst and maintained at a temperature of 300° to 500° C., and condensing tetrachloroethylene from the reaction product. Among the porous surface catalysts suitable for use in my process are coke, charcoal, pumice, alundum, silica gel and metallic oxide gels generally, unglazed porcelain, etc. When olefine chlorides higher in the series than ethylene chloride are treated in the foregoing manner, carbon tetrachloride is produced concurrently with the tetrachloroethylene.

The following Equations (1) and (2) illustrate the reaction by which tetrachloroethylene is obtained from ethylene chloride and propylene chloride, respectively, by my process, and Equation (2) shows the concurrent product of carbon tetrachloride.

(1) 
(2) 

I can use olefine chlorides, such as butylene and amylene chloride in my process, but the yields of tetrachloroethylene obtained are not as high as when the lower members of the series are used since more carbon tetrachloride is produced. The foregoing reactions are exothermic in character and I have found that by exercising proper control it is possible to carry out the process without supplying any additional heat beyond that generated by the reaction.

To produce a mixture of an olefine chloride and chlorine suitable for passing into the reactor I have found it convenient to preheat the olefine chloride to a temperature between about 120° and 180° C. before admixing the chlorine therewith. Highly purified chlorine is not essential for use in my process, in fact, I have successfully used chlorine containing up to 20 per cent of air. The type of vessel in which the mixture of olefine chloride and chlorine may be reacted is capable of considerable variation as regards structure; but I have found that a reactor containing a plurality of small tubes, say about one inch inside diameter, through which the reactants are passed, may be used advantageously.

The tubes of the reactor are filled with a suitably screened and sized porous surface catalyst. One of the functions of such catalyst is to prevent the propagation of flame in the reactor tubes, such as would occur if the tubes were empty. To assist in the proper control of the exothermic reaction within the tubes I have found that by circulating therearound a suitable heat transfer fluid that the temperature can be controlled within narrow limits. The heat transfer fluid stabilizes the temperature by supplying heat to the reactants when the reaction rate falls, and by extracting heat therefrom when the reaction becomes too rapid. The temperature of the reaction can be controlled within narrow limits in such a reactor resulting in better yields of tetrachloroethylene.

The heat transfer fluid, if liquid, should have a boiling point between about 300° and 500° C. Among the suitable substances which I may use are chlorinated diphenyloxides, diphenylbenzene, sodium nitrite, metallic sodium, mercury, high velocity recirculated gas, such as air or stack gases, etc.

The condensation from the reaction products of the tetrachloroethylene, and carbon tetrachloride when such is a product, may be effected in any suitable way. For example, by spraying water directly into the gases and layering-off the resulting condensate. The condensation may also be effected in a coil or plate-type condenser. A very pure tetrachloroethylene can be obtained from the condensate upon one distillation.

Figure 2:
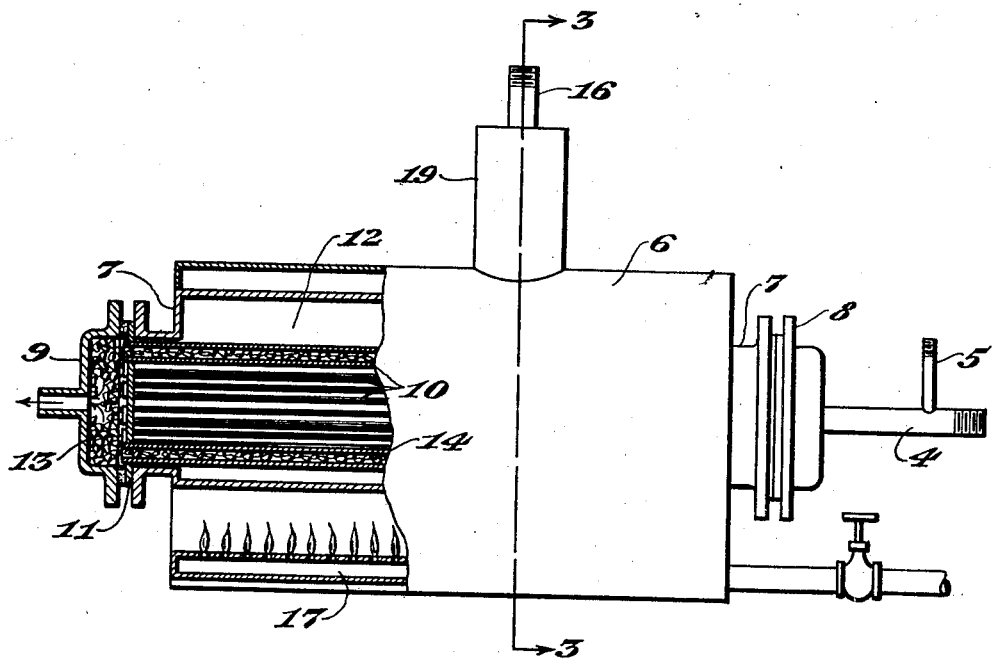
Figure 2 is a side elevation, partially in section, of the reactor shown in Figure 1.
Figure 3:
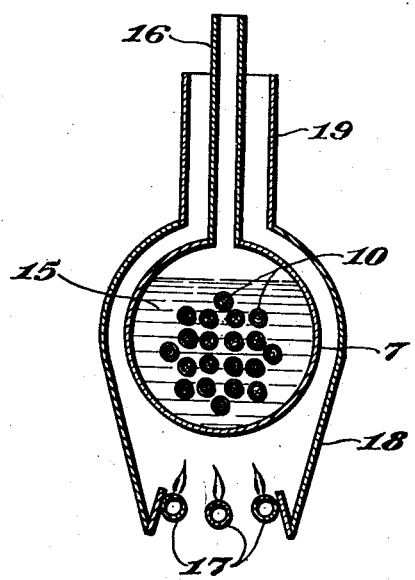
Figure 3 is a sectional elevation of the reactor in Figure 2 taken on the line 3—3.

Referring now to Figure 1, an olefine chloride is introduced through pipe 1 into a preheater and vaporizer 2, shown here as a double pipe coil, with steam circulated through the outer coil to heat the olefine chloride. The vapors of olefine chloride pass from the preheater through a pipe 3 into a mixing chamber 4. Chlorine is admitted to the mixing chamber through a pipe 5 and the mixture of gases then passes into the reactor 6, shown in detail in Figures 2 and 3.

The reactor consists of an inner shell 7 having a flanged opening at either end. The openings are closed by a flanged inlet cap 8 and a similar outlet cap 9. A bundle of tubes 10 is contained within the reactor inner shell 7. The tubes are held in place by a tube sheet at either end, designated at the outlet end by the numeral 11. The tube sheets are interposed between the inner shell flanges and the cap flanges to form a fluid-tight joint, thereby preventing communication between the chamber 12 surrounding the tubes 10 and the chambers 13 in the inlet and outlet caps. The tubes 10 and chambers 13 are packed with a porous surface catalytic agent 14. The chamber 12 within the reactor inner shell 7 contains a heat transfer fluid 15. This heat transfer fluid may be partially vaporized during operation, in which case the vapors rise into the reflux condenser 16. Gas burners 17 are provided to supply such heat to the reaction chamber as may be necessary. The products of combustion from the burners pass through the jacket 18 around the reactor shell 7 and escape through the stack 19.

The products of reaction leave the reactor through a pipe 20 and pass into a condenser 21. The crude liquor condensed therein is drawn off to a storage 22 from which it may be withdrawn as desired for distillation to recover substantially pure tetrachloroethylene therefrom. The uncondensed gases pass from the condenser into a scrubber tower 23 which removes by a water spray the hydrogen chloride contained therein.

An example illustrating the practice of my invention in apparatus as hereinbefore described is as follows:—Ethylene chloride was passed into the preheater and the temperature thereof raised to about 150° C., whereupon it was mixed with approximately twice its weight of chlorine and the mixed gases were passed into the reactor. The reactor tubes were packed with coke, sized to pass through a standard screen having 4 meshes to the inch and be retained on a standard screen having 8 meshes to the inch. Diphenylbenzene was used as the heat transfer fluid, and was heated to a temperature of about 375° C. before the ethylene chloride-chlorine mixture was admitted to the reactor. The rate at which the reactants were passed into the coke-packed tubes of the reactor was so controlled that the reaction temperature remained substantially constant at about 375° C. Operation under the conditions just outlined for periods of a week and longer have resulted in yields of tetrachloroethylene averaging about 70 per cent based on the amount of ethylene chloride fed into the reactor.

Crude liquor resulting from carrying out the foregoing process was subjected to distillation with the following results:—A 750 cc. sample began to boil at 75° C. and from that temperature to 119° C. 97.5 milliliters of distillate was collected. At exactly 119° C. there was obtained 600 milliliters of tetrachloroethylene. When the temperature started to rise above 119° C. the distillation was stopped. The residue, 52.5 milliliters, was substantially hexachloroethane. This shows approximately 80 per cent of the crude liquor was substantially pure tetrachloroethylene.

When using propylene chloride as the olefine chloride, I have obtained a crude liquor containing approximately 20 per cent by volume of carbon tetrachloride and 55 per cent by volume of tetrachloroethylene. The temperature conditions under which the conversion was carried out were approximately the same as when using ethylene chloride as raw material.

Among the advantages which inure to my novel process for the preparation of tetrachloroethylene from olefine chlorides are:—(1) a very high percentage of the olefine chloride is converted to tetrachloroethylene; and, (2) the thermal efficiency of the process is extremely high because the heat required is supplied by the reaction.

Other modes of applying the principle of my invention may be employed instead of those explained, change being made as regards the process herein disclosed, provided the step or steps stated by any of the following claims or the equivalent of such stated step or steps be employed.

I therefore particularly point out and distinctly claim as my invention:—

1. In preparing tetrachloroethylene, the step which consists in subjecting a mixture of an olefine chloride and chlorine to a temperature between about 300° and about 500° C. in the presence of a porous surface catalyst.

2. In preparing tetrachloroethylene, the steps which consist in subjecting a mixture of an olefine chloride and chlorine to a temperature between about 300° and about 500° C. in the presence of a porous surface catalyst, cooling the reaction products, and separating tetrachloroethylene therefrom.

3. In preparing tetrachloroethylene, the steps which consist in preheating an olefine chloride to vaporize the same, mixing therewith chlorine, subjecting the mixture of gas to a temperature between about 300° and about 500° C. in the presence of a porous surface catalyst, cooling the reaction products, and separating tetrachloroethylene therefrom.

4. In preparing tetrachloroethylene, the steps which consist in preheating an olefine chloride to a temperature between about 120° and about 180° C., mixing therewith chlorine, passing the so formed mixture of gases into a reaction zone containing a porous surface catalyst and maintained at a temperature between about 300° and about 500° C., cooling the reaction products, and separating tetrachloroethylene therefrom.

5. In preparing tetrachloroethylene, the steps which consist in preheating an olefine chloride, mixing therewith chlorine, passing the so formed mixture into a reaction chamber maintained at a temperature between about 300° and about 500° C. containing a porous surface catalyst and surrounded by a heat transfer fluid, cooling the reaction products, and separating tetrachloroethylene therefrom.

6. In preparing tetrachloroethylene, the steps which consist in preheating an olefine chloride higher in the series than ethylene chloride, mixing therewith chlorine, passing the so formed mixture into a reaction chamber maintained at a temperature between about 300° and about 500° C. containing a porous surface catalyst and surrounded by a heat transfer fluid, cooling the reaction products, and distilling the products to separate carbon tetrachloride and tetrachloroethylene therefrom.

7. In preparing tetrachloroethylene, the steps which consist in preheating ethylene chloride to a temperature between about 120° and about 180° C., mixing therewith chlorine, passing the so formed mixture into a reaction chamber containing a porous surface catalyst and maintained at a temperature between about 300° and about 500° C., cooling the reaction products, and separating tetrachloroethylene therefrom.

8. In preparing tetrachloroethylene, the steps which consist in preheating ethylene chloride to a temperature of about 150° C., mixing therewith chlorine, passing the so formed mixture into a reaction chamber maintained at a temperature of about 375° C., packed with a porous surface catalyst and surrounded with a heat transfer fluid, cooling the reaction products to about room temperature, and distilling the liquid products to separate tetrachloroethylene therefrom.

JOHN H. REILLY.